(12) United States Patent
Lin

(10) Patent No.: US 9,915,546 B2
(45) Date of Patent: Mar. 13, 2018

(54) NAVIGATION SYSTEM WITH ROUTE CORRECTION MECHANISM AND METHOD OF OPERATION THEREOF

(71) Applicant: Telenav, Inc., Sunnyvale, CA (US)

(72) Inventor: Hongzhu Lin, Shanghai (CN)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 13/897,276

(22) Filed: May 17, 2013

(65) Prior Publication Data

US 2014/0343839 A1 Nov. 20, 2014

(51) Int. Cl.
G01C 21/34 (2006.01)
G01C 21/00 (2006.01)
G01C 21/36 (2006.01)

(52) U.S. Cl.
CPC ..... G01C 21/3641 (2013.01); G01C 21/3626 (2013.01)

(58) Field of Classification Search
None
See application file for complete search history.

(56) References Cited

U.S. PATENT DOCUMENTS

| | | | | |
|---|---|---|---|---|
| 5,262,775 A * | 11/1993 | Tamai et al. | | 340/995.21 |
| 5,369,588 A * | 11/1994 | Hayami et al. | | 340/995.19 |
| 5,541,845 A * | 7/1996 | Klein | | 701/446 |
| 5,652,706 A * | 7/1997 | Morimoto et al. | | 701/416 |
| 5,757,289 A * | 5/1998 | Nimura et al. | | 340/995.21 |
| 5,926,118 A * | 7/1999 | Hayashida et al. | | 340/995.21 |
| 6,023,653 A * | 2/2000 | Ichimura et al. | | 701/446 |
| 6,298,304 B1 * | 10/2001 | Theimer | | 701/412 |
| 6,487,496 B2 * | 11/2002 | Katayama et al. | | 701/417 |
| 7,392,134 B2 | 6/2008 | Tauchi et al. | | |
| 2004/0204846 A1 * | 10/2004 | Yano et al. | | 701/210 |
| 2004/0215392 A1 * | 10/2004 | Nam et al. | | 701/210 |
| 2005/0135658 A1 * | 6/2005 | Yamamoto et al. | | 382/104 |
| 2005/0216190 A1 * | 9/2005 | Obata | | 701/209 |
| 2006/0116815 A1 * | 6/2006 | Nomura | | 701/210 |
| 2006/0116816 A1 * | 6/2006 | Chao et al. | | 701/210 |
| 2006/0142940 A1 * | 6/2006 | Choi | | 701/210 |
| 2008/0004802 A1 * | 1/2008 | Horvitz | | 701/209 |
| 2008/0275636 A1 * | 11/2008 | Hirose | | 701/201 |
| 2008/0312766 A1 * | 12/2008 | Couckuyt | | 700/201 |
| 2009/0125229 A1 * | 5/2009 | Peri et al. | | 701/201 |
| 2009/0234577 A1 * | 9/2009 | Rinscheid | | 701/201 |
| 2010/0268460 A1 * | 10/2010 | Wan et al. | | 701/210 |
| 2011/0010094 A1 * | 1/2011 | Simon | | 701/301 |
| 2012/0288154 A1 * | 11/2012 | Shima et al. | | 382/103 |
| 2013/0009760 A1 * | 1/2013 | Washlow et al. | | 340/425.5 |
| 2013/0090846 A1 * | 4/2013 | Couckuyt | | 701/466 |

(Continued)

FOREIGN PATENT DOCUMENTS

| | | |
|---|---|---|
| CN | 102483329 A | 5/2012 |
| CN | 103047989 A | 4/2013 |
| CN | 103063221 A | 4/2013 |

*Primary Examiner* — Navid Ziaeianmehdizadeh

(74) *Attorney, Agent, or Firm* — IP Investment Law Group

(57) ABSTRACT

A method of operation of a navigation system includes: generating a route for navigating to a destination; determining a travel deviation based on a current location and the route; determining an error prone scenario based on the current location, the travel deviation, and the route; and updating an error-prone-scenario switch based on the error prone scenario for displaying on a device.

18 Claims, 7 Drawing Sheets

(56) References Cited

U.S. PATENT DOCUMENTS

| | | | |
|---|---|---|---|
| 2013/0096821 A1* | 4/2013 | Wong et al. | 701/428 |
| 2013/0096828 A1* | 4/2013 | Fujimoto | G01C 21/3676 |
| | | | 701/533 |
| 2013/0124085 A1* | 5/2013 | Mochizuki et al. | 701/466 |
| 2013/0304382 A1* | 11/2013 | Nomoto et al. | 701/533 |
| 2013/0345975 A1* | 12/2013 | Vulcano et al. | 701/533 |
| 2014/0046594 A1* | 2/2014 | Watanabe | G08G 1/0112 |
| | | | 701/533 |
| 2014/0171013 A1* | 6/2014 | Varoglu et al. | 455/404.2 |

* cited by examiner

NAVIGATION SYSTEM WITH ROUTE CORRECTION MECHANISM AND METHOD OF OPERATION THEREOF

TECHNICAL FIELD

The present invention relates generally to a navigation system, and more particularly to a system for route correction mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take myriad directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other point of interest (POI). The real-time information provides invaluable relevant information.

However, misleading navigation is of paramount concern to the consumer. Consumers driving to the destination will be unable to follow the incorrect navigation guidance.

Thus, a need still remains for a navigation system with route correction mechanism to support accurate navigation. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a route for navigating to a destination; determining a travel deviation based on a current location and the route; determining an error prone scenario based on the current location, the travel deviation, and the route; and updating an error-prone-scenario switch based on the error prone scenario for displaying on a device.

The present invention provides a navigation system, including: a route generator module for generating a route for navigating to a destination; a deviation detection module, coupled to the route generator module, for determining a travel deviation based on a current location and the route; an error-prone-scenario detection module, coupled to the deviation detection module, for determining an error prone scenario based on the current location, the travel deviation, and the route; and a switch module, coupled to the error-prone-scenario detection module, for updating an error-prone-scenario switch based on the error prone scenario for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
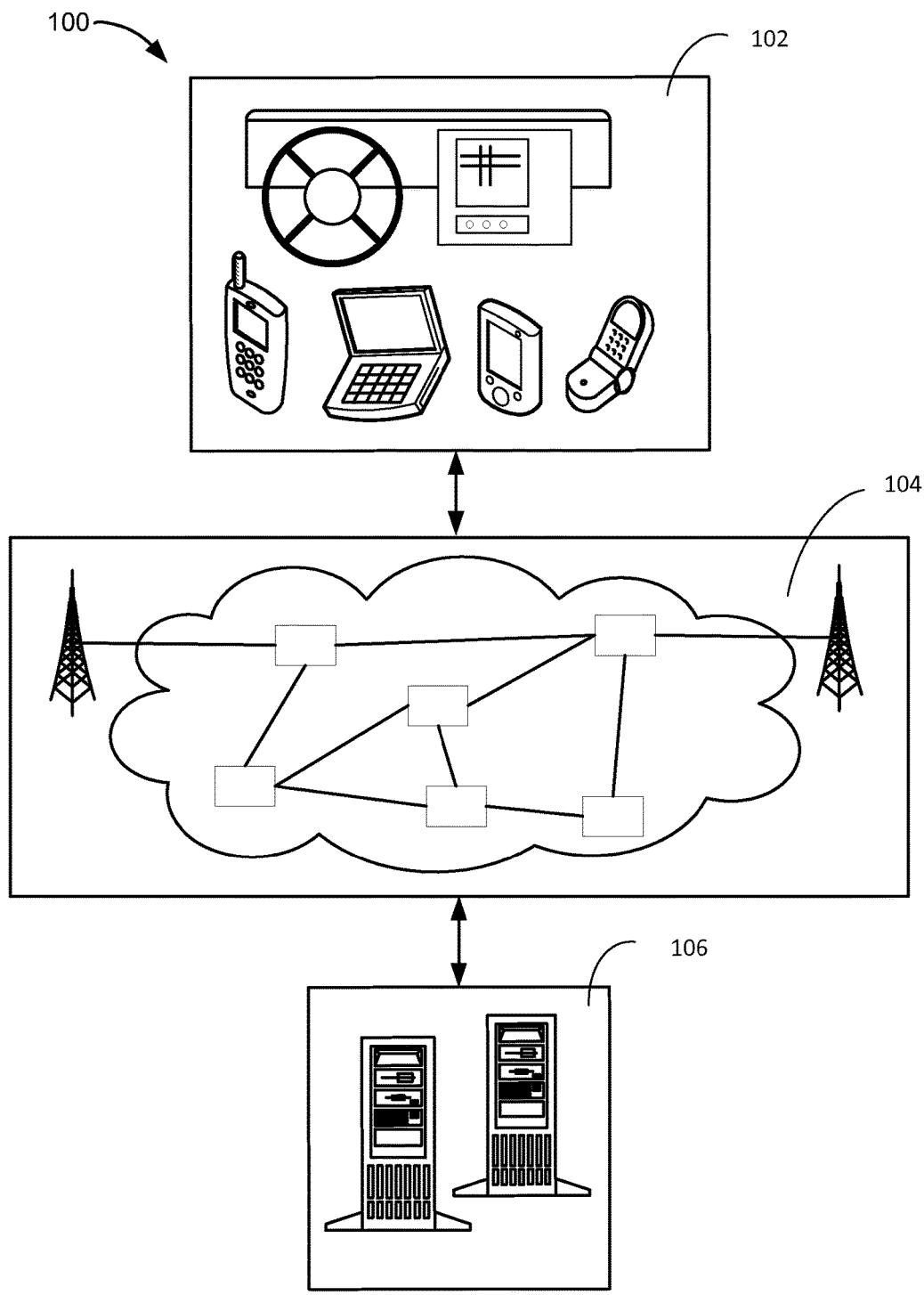
FIG. 1 is a navigation system with route correction mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown is a navigation system 100 with route correction mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™ or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
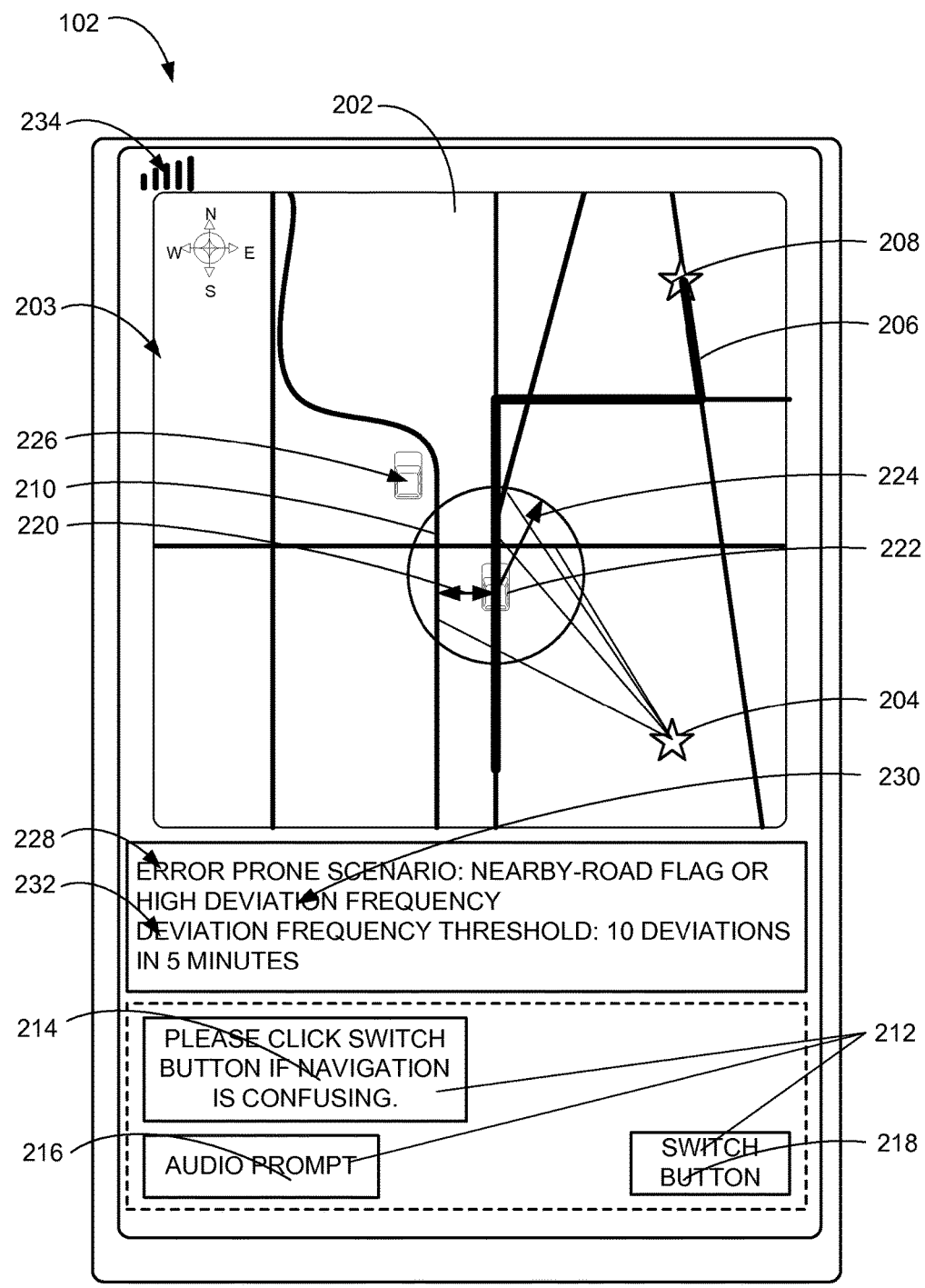
FIG. 2 is an example of a display on a display interface of the first device.

Referring now to FIG. 2, therein is shown an example of a display on a display interface 202 of the first device 102. The display interface 202 can depict a map 203. The map 203 can show a nearby-road flag 204, a route 206, a destination 208, and an adjacent road 210. The map 203 can also display a distance 220, a current location 222, and a distance threshold 224.

The distance threshold 224 is defined as a specified distance for classifying portions of the road relative to the current location 222. The nearby-road flag 204 is defined as an indication of the presence of more than one road located within the distance threshold 224 from the current location 222 of the first device 102. For example, the nearby-road flag 204 can be 1 or 0, or a true or false.

The adjacent road 210 is defined as a portion of a road identified to be within a distance threshold 224 from the current location 222 of the first device 102. For example, the adjacent road 210 can be an adjacent parallel road, a branched road, a cross road, a road that is either over or below another road, or a combination thereof.

The display interface 202 can also show an error-prone-scenario switch 212, an error prone scenario 228, a high deviation frequency 230, and a deviation frequency threshold 232. The error-prone-scenario switch 212 can be implemented using a pop-up dialog 214, an audio prompt 216, a switch button 218, or a combination thereof.

The error-prone-scenario switch 212 is defined as a user interface based on frequent deviation along the route 206, multiple adjacent roads around the navigation system 100 of FIG. 1, or a combination thereof, for minimizing confusion in following the route 206. The error-prone-scenario switch 212 can include the pop-up dialog 214, the audio prompt 216, the switch button 218, or a combination thereof. The error-prone-scenario switch 212 can interact with the user when the error prone scenario 228 is determined.

For example, the navigation system 100 can display the switch button 218 and the pop-up dialog 214 to prompt the user to click the switch button 218 if the error prone scenario 228 is determined. Also for example, the navigation system 100 can play the audio prompt 216 to ask user to click the switch button 218 if the error prone scenario 228 is determined.

The error prone scenario 228 is defined as a flag indicating a situation prone to cause navigation error. The error prone scenario 228 can be the nearby-road flag 204, or the high deviation frequency 230. For example, the error prone scenario 228 can be determined when the nearby-road flag 204 is determined. Also for example, the error prone scenario 228 can be determined when the times of the deviation from the route 206 within a time period is above the deviation frequency threshold 232.

The deviation frequency threshold 232 is defined as a specified number of occurrences where the current location 222 deviates from the route within a specified period of time. For example, the configuration can be ten deviations in five minutes, or five deviations in two minutes.

The high deviation frequency 230 is defined as a flag for indicating the number of deviation in a time period being higher than the deviation frequency threshold 232. For example, if the deviation frequency threshold 232 is set to ten deviations in five minutes, the high deviation frequency 230 can be determined to one or true when there are twelve deviations in five minutes It has been discovered that the error prone scenario 228 and the error-prone-scenario switch 212 provide user with a simplified interfacing mechanism to reduce unintended deviations by the user when following the route 206. The error prone scenario 228 can reduce unintended deviations by enabling the navigation system 100 to identify portions on the route 206 that can cause the error prone scenario 228 by the user. The error-prone-scenario switch 212 can provide the improved interface by giving the user choices for receiving the guidance and allowing the user to choose using various input modes, such as through voice commands or by selecting an icon on a touch-screen, which can allow the navigation system 100 to take appropriate remedial measures to prevent the error prone scenario 228.

The display interface 202 can also show a travel deviation 226, and a signal strength 234. The travel deviation 226 is defined a flag indicating when the current location 222 of the first device 102 does not overlap the route 206 of the navigation system 100.

Figure 3:
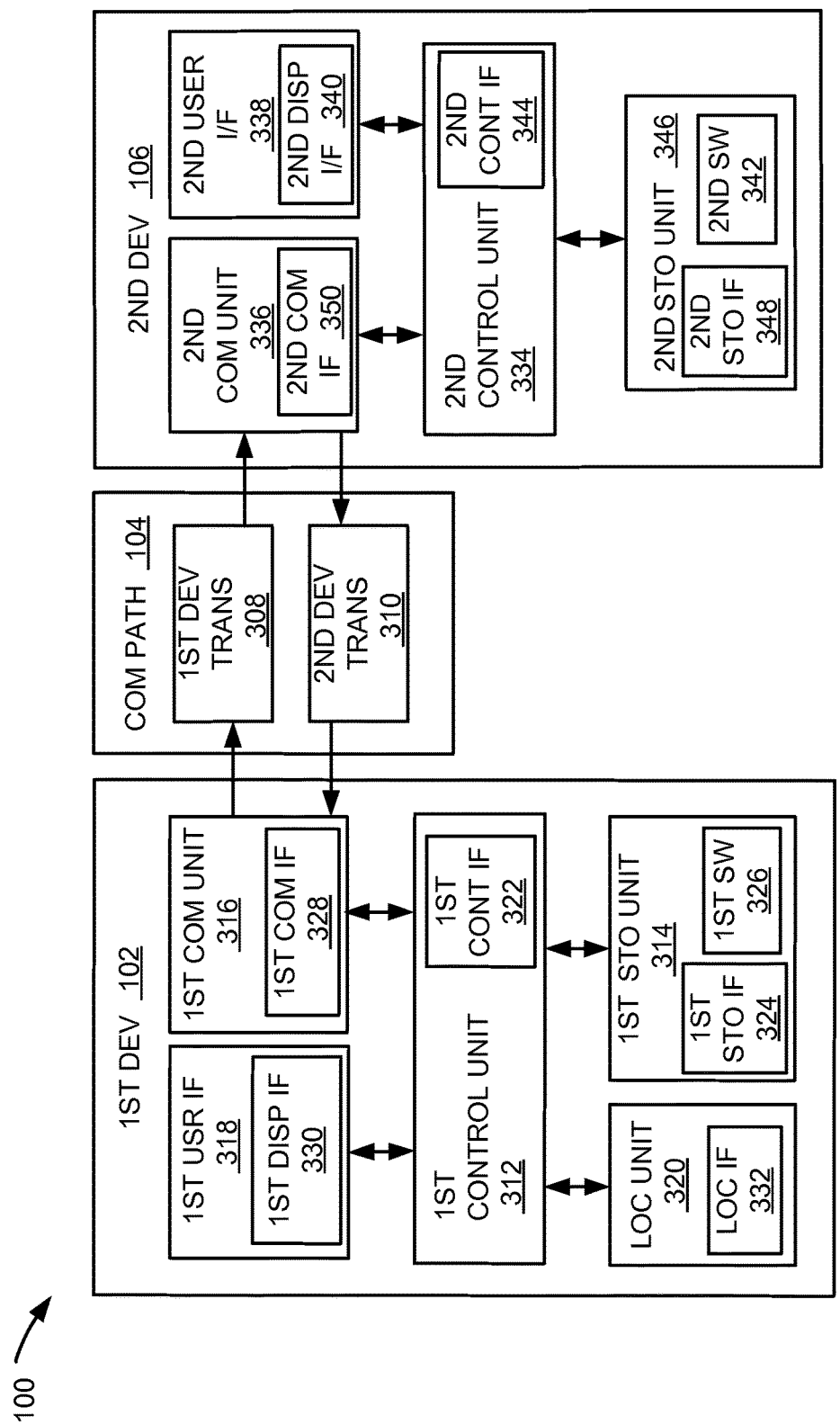
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first device 102 can be similarly described by the first device 102.

The first control unit 312 can include a first control interface 322. The first control unit 312 can execute a first software 326 to provide the intelligence of the navigation system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, point of interest (POI), navigation routing entries, reviews/ratings, feedback, traffic patterns, or any combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344.

For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest, navigation routing entries, reviews/ratings, feedback, traffic patterns, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

Figure 4:
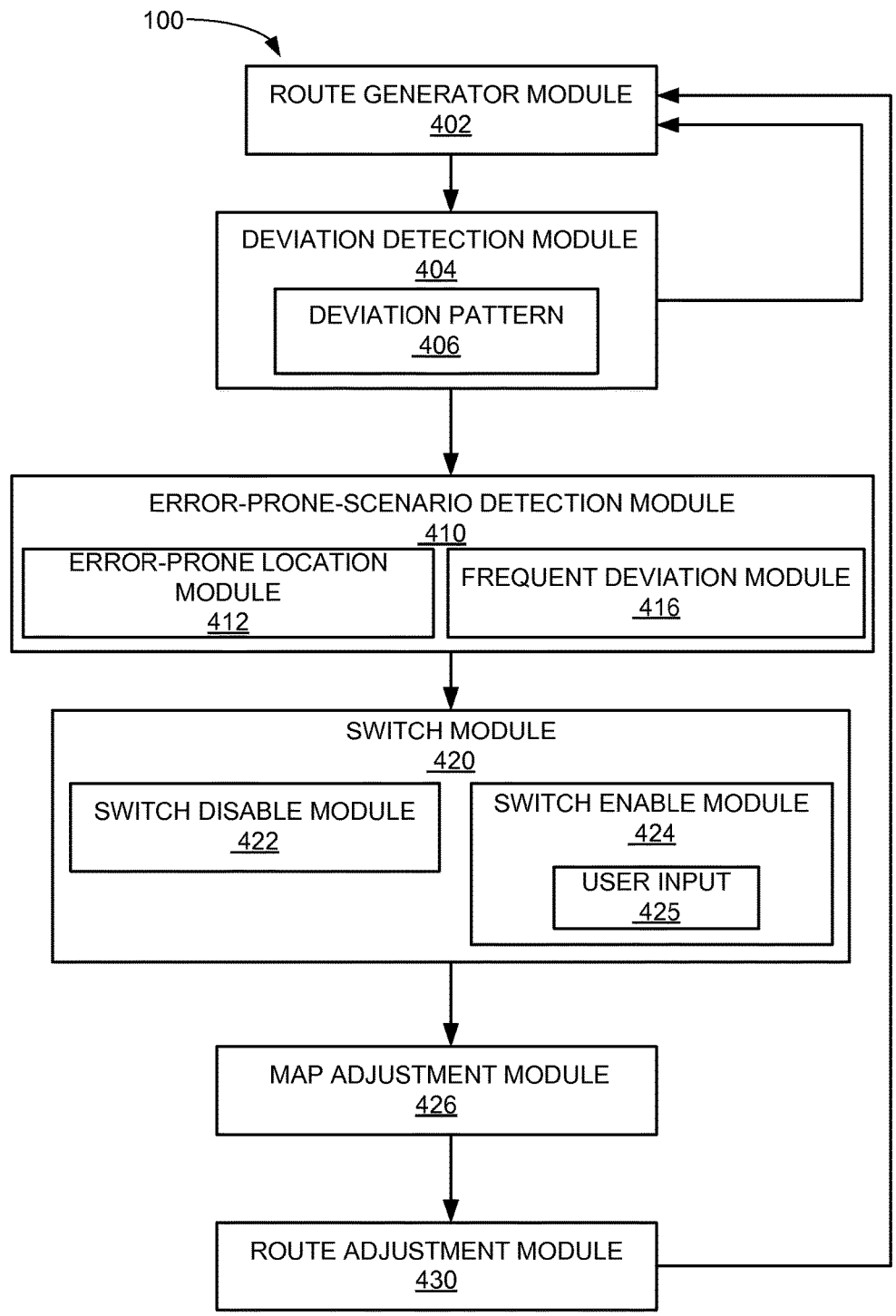
FIG. 4 is a control flow of the navigation system.

Referring now to FIG. 4, therein is shown a control flow of the navigation system 100. The navigation system 100 can include a route generator module 402. The route generator module 402 generates the route 206 of FIG. 2 to the destination 208 of FIG. 2. The route generator module 402 can calculate segments and these in turn are composed of edges with a collection of shape points between the current location 222 of FIG. 2 and the destination 208.

The navigation system 100 can also include a deviation detection module 404, coupled to the route generator module 402. The deviation detection module 404 determines the travel deviation 226 of FIG. 2. The deviation detection module 404 can determine the travel deviation 226 by using a deviation pattern 406, the current location 222 and the route 206 from the route generator module 402. The navigation system 100 can respond to the travel deviation 226 by passing the travel deviation 226 to the route generator module 402, which can trigger the route generator module 402 to re-route to the destination 208. The deviation detection module 404 will be described in further detail below.

The deviation pattern 406 is defined as a type of recurring deviation events. For example, the deviation pattern 406 can be a map error pattern when there are many deviations happen at the same location and the deviations are caused by map error. Also for example, the deviation pattern 406 can be a habitual pattern when the user always stops at Starbucks™ for coffee. The deviation pattern 406 can be predetermined by navigation system 100, the software or hardware manufacturer, or a combination thereof.

The navigation system 100 can also include an error-prone-scenario detection module 410, coupled to the deviation detection module 404. The error-prone-scenario detection module 410 determines the error prone scenario 228 of FIG. 2. The error-prone-scenario detection module 410 can determine the error prone scenario 228 by using the nearby-road flag 204 of FIG. 2 or the high deviation frequency 230 of FIG. 2. The error-prone-scenario detection module 410 can receive the route 206 and the travel deviation 226 as inputs, and send the error prone scenario 228 as output.

The error-prone-scenario detection module 410 can include an error-prone location module 412. The error-prone location module 412 determines the nearby-road flag 204. The error-prone location module 412 can determine the nearby-road flag 204 when the number of the adjacent road 210 of FIG. 2 is greater than one. The error-prone location module 412 will be described in further detail below.

The error-prone-scenario detection module 410 can also include a frequent deviation module 416. The frequent deviation module 416 determines the high deviation frequency 230. The frequent deviation module 416 can determine the high deviation frequency 230 when a number of determined occurrences for the travel deviation 226 during a time period is greater than the deviation frequency threshold 232 of FIG. 2. The frequent deviation module 416 will be described in further detailed below.

The navigation system 100 can also include a switch module 420, coupled to the error-prone-scenario detection module 410. The switch module 420 updates the error-prone-scenario switch 212 of FIG. 2. The switch module 420 can update the error-prone-scenario switch 212 based on the error prone scenario 228 being determined for displaying on the device 102 of FIG. 1. The error-prone-scenario switch 212 can allow the user to choose using various input modes, such as through voice commands or by selecting an icon on a touch-screen. The switch module 420 can receive the error prone scenario 228 as input, and output the error-prone-scenario switch 212.

The switch module 420 can include a switch disable module 422. The switch disable module 422 disables the error-prone-scenario switch 212. The switch disable module 422 can disable the error-prone-scenario switch 212 when the nearby-road flag 204 and the high deviation frequency 230 is not determined.

For example, if both the high deviation frequency 230 and the nearby-road flag 204 are not determined, the switch disable module 422 can disable the error-prone-scenario switch 212 automatically by hiding the pop-up dialog 214 of FIG. 2, the switch button 218 of FIG. 2, or a combination thereof. The navigation system 100 can also disable the error-prone-scenario switch 212 by disabling the switch button 218.

The switch module 420 can also include a switch enable module 424. The switch enable module 424 enables the error-prone-scenario switch 212. The switch enable module 424 can enable the error-prone-scenario switch 212 for enabling a user input 425 when the nearby-road flag 204 or the high deviation frequency 230 is determined.

For example, the nearby-road flag 204 can be determined based on four roads nearby the current location 222. The navigation system 100 can enable the error-prone-scenario switch 212 by prompting the pop-up dialog 214, playing the audio prompt 216 of FIG. 2, showing the switch button 218, or a combination thereof.

The navigation system 100 can also include a map adjustment module 426, coupled to the switch enable module 424. The map adjustment module 426 records the current location 222 for adjusting the map 203 of FIG. 2 in response to the high deviation frequency 230. For example, the navigation system 100 can check the map 203 for the location where the high deviation frequency 230 is determined for a specified number of users, and adjust the map 203 when there is any map error. The map adjustment module 426 can receive the high deviation frequency 230 and output the map 203 adjusted.

The navigation system 100 can also include a route adjustment module 430, coupled to the map adjustment module 426. The route adjustment module 430 adjusts the route 206 to the destination 208 for responding to the user input 425. The route adjustment module 430 can adjust the route 206 by sending the current location 222 to the route generator module 402. The user input 425 can be a voice instruction, or a click on the error-prone-scenario switch 212 by the user.

The route generator module 402 can be implemented by the navigation system 100. The route generator module 402 can be implemented by the second control unit 334 of FIG. 3, and can make use of the second storage unit 346 of FIG. 3, the second software 342 of FIG. 3, the second communication unit 336 of FIG. 3, or some combination thereof.

For example, the route generator module 402 can receive the destination 208 from the second communication unit 336 and store the destination 208 in the second storage unit 346 by utilizing the second control unit 334. The route generator module 402 can also utilize the second control unit 334 to operate the second software 342 to generate the route 206 and store the route 206 in the second storage unit 346.

For illustrative purposes, the route generator module 402 is described as being implemented by the second control unit 334, although it is understood that the route generator module 402 can be implemented differently. For example, the route generator module 402 can utilize the first control unit 312 of FIG. 3 to retrieve the route 206 from the first storage unit 314 of FIG. 3. The route generator module 402 can utilize the first control unit 312 to control the first software 326 of FIG. 3 to operate the first communication unit 316 of FIG. 3 and transit the route 206 to the second storage unit 346.

The deviation detection module 404 can be implemented by the navigation system 100. The deviation detection module 404 can be implemented by the second control unit 334, the second storage unit 346, the second software 342, or some combination thereof. For example, the deviation detection module 404 can utilize the second control unit 334 to store the current location 222 in the second storage unit 346. The second control unit 334 can operate the second software 342 to analyze the current location 222 and the route 206 to determine the travel deviation 226.

For illustrative purposes, the deviation detection module 404 is described as being implemented by the second control unit 334, although it is understood that the deviation detection module 404 can be implemented differently. For example, the deviation detection module 404 can utilize the first control unit 312 to operate the first software 326 to determine the travel deviation 226. The travel deviation 226 can be retrieved from the first storage unit 314 and transmit through the first communication unit 316 to the second storage unit 346.

The error-prone-scenario detection module 410 can be implemented by the navigation system 100. The error-prone-scenario detection module 410 can be implemented with the first control unit 312 and can make use of the first software 326, the first storage unit 314, the first communication unit 316, or some combination thereof. For example, the error-prone-scenario detection module 410 can receive the travel deviation 226 and store the travel deviation 226 in the first storage unit 314 by utilizing the first control unit 312.

The error-prone-scenario detection module 410 can use the first communication unit 316 to receive the travel deviation 226 from the second software 342 which can be implemented by the second control unit 334 and then store the travel deviation 226 in the first storage unit 314. The error-prone-scenario detection module 410 can utilize the first control unit 312 to operate the first software 326 to determine the high deviation frequency 230 based on the travel deviation 226.

For illustrative purposes, the error-prone-scenario detection module 410 is described as being implemented by the first control unit 312, with values being stored in the first storage unit 314, although it is understood that the error-prone-scenario detection module 410 can be implemented differently. For example, the error-prone-scenario detection module 410 can be implemented by the second control unit 334, with the travel deviation 226 and the route 206 being stored in the second storage unit 346. Also for example, the second control unit 334 can determine the nearby-road flag 204 and use the second communication unit 336 to send the nearby-road flag 204 to the first storage unit 314.

The switch module 420 can be implemented by the navigation system 100. The switch module 420 can be implemented by the second control unit 334, the second storage unit 346, the second software 342, or some combination thereof. For example, the switch module 420 can utilize the second control unit 334 to store the nearby-road flag 204 in the second storage unit 346. The second control unit 334 can enable or disable the error-prone-scenario switch 212 based on the nearby-road flag 204.

For illustrative purposes, the switch module 420 is described as being implemented by the second control unit 334, although it is understood that the switch module 420 can be implemented differently. For example, the switch module 420 can utilize the first control unit 312 to operate the first software 326 to enable the error-prone-scenario switch 212. The error-prone-scenario switch 212 enabled can be retrieved from the first storage unit 314 and transmit through the first communication unit 316 to the second storage unit 346. Also for example, after the first software 326 is used to enable the error-prone-scenario switch 212, the first control unit 312 can operate the first display interface 330 of FIG. 3 to display the error-prone-scenario switch 212.

The map adjustment module 426 can be implemented by the navigation system 100. The map adjustment module 426 can be implemented by the second control unit 334, the second storage unit 346, the second software 342, or some combination thereof. For example, the second control unit 334 can operate the second software 342 to analyze the current location 222 recorded for adjusting the map error.

For illustrative purposes, the map adjustment module 426 is described as being implemented by the second control unit 334, although it is understood that the map adjustment module 426 can be implemented differently. For example, the map adjustment module 426 can utilize the first control unit 312 to operate the first storage unit 314 to save the current location 222 with the error prone scenario 228.

The route adjustment module 430 can be implemented by the navigation system 100. The route adjustment module 430 can be implemented by the second control unit 334, the second storage unit 346, the second software 342, or some combination thereof. For example, the second control unit 334 can operate the second software 342 to adjust the route 206 to the destination 208 after the error-prone-scenario switch 212 that is enabled being clicked.

For illustrative purposes, the route adjustment module 430 is described as being implemented by the second control unit 334, although it is understood that the route adjustment module 430 can be implemented differently. For example, the route adjustment module 430 can utilize the first control unit 312 to operate the first storage unit 314 to save the route 206 which is re-calculated by the navigation system 100.

The modules can be implemented with hardware implementations, including hardware acceleration units (not shown) in the first control unit 312 or the second control unit 334, separate hardware blocks (not shown) or functional units (not shown) in the first device 102 or the second device 106 of FIG. 1 outside the first control unit 312 and the second control unit 334.

Figure 5:
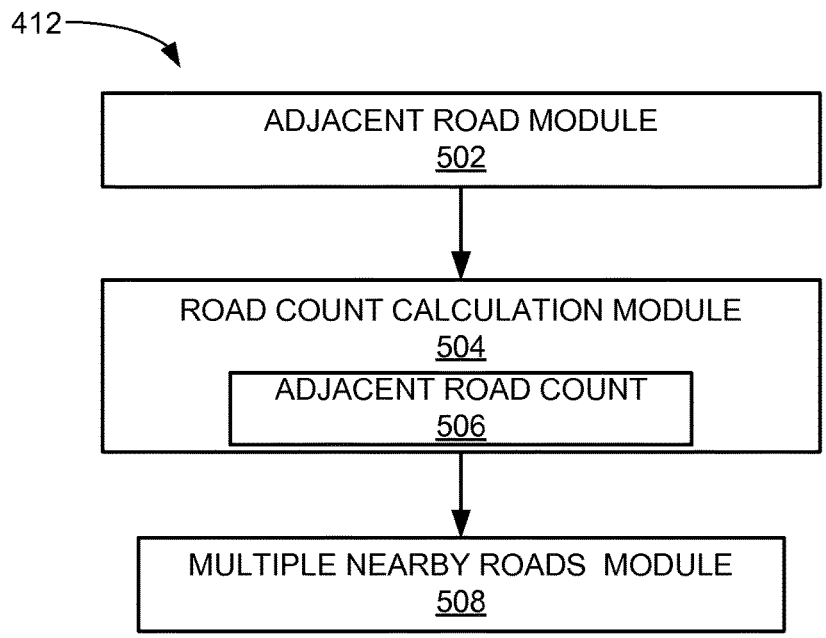
FIG. 5 is a control flow of the error-prone location module.

Referring now to FIG. 5, therein is shown a control flow of the error-prone location module 412. The error-prone location module 412 determines the nearby-road flag 204 of FIG. 2. The error-prone location module 412 can determine the nearby-road flag 204 of FIG. 2 based on the number of the adjacent road 210 of FIG. 2 being greater than one.

The error-prone location module 412 can include an adjacent road module 502, coupled to the deviation detection module 404 of FIG. 4. The adjacent road module 502 determines the adjacent road 210 with the distance 220 of FIG. 2 between the adjacent road 210 and the current location 222 of FIG. 2 less than the distance threshold 224 of FIG. 2. For example, the adjacent road module 502 can locate the current location 222 in a specified time period, such as five seconds, one minute and determines the adjacent road 210 based on the current location 222.

The error-prone location module 412 can also include a road count calculation module 504, coupled to the adjacent road module 502. The road count calculation module 504 calculates an adjacent road count 506. The road count calculation module 504 can calculate the adjacent road count 506 by incrementing the adjacent road count 506 for the adjacent road 210.

For example, there can be four roads near the current location 222 with the distance 220 within the distance threshold 224, including a parallel road, an overhead highway, a branched road ahead, and a current road. In this case, the adjacent road count 506 is four. Also for example, there can be only one road near the current location 222 with the distance 220 within the distance threshold 224. In this case, the adjacent road count 506 is one.

The error-prone location module 412 can also include a multiple nearby roads module 508, coupled to the road count calculation module 504. The multiple nearby roads module 508 determines the nearby-road flag 204. The multiple nearby roads module 508 can determine the nearby-road flag 204 when the adjacent road count 506 is greater than one.

It has been discovered that the nearby-road flag 204 and the error-prone-scenario switch 212 of FIG. 2 provide user with a simplified interfacing mechanism to reduce unintended deviations by the user when following the route 206 of FIG. 2. The nearby-road flag 204 can reduce unintended deviations by enabling the navigation system 100 of FIG. 1 to identify portions on the route 206 that can cause the user confusion. The error-prone-scenario switch 212 can provide the improved interface by giving the user choices for receiving the guidance and allowing the user to choose using various input modes, such as through voice commands or by selecting an icon on a touch-screen, which can allow the navigation system 100 to take appropriate remedial measures to prevent the error-prone location.

Figure 6:
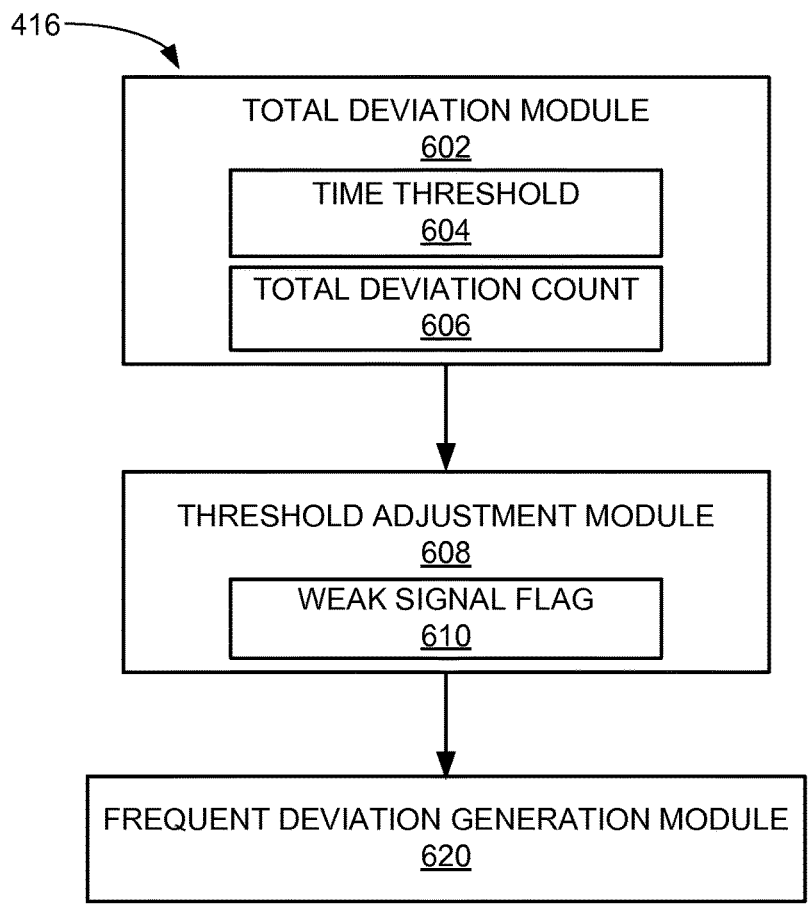
FIG. 6 is a control flow of the frequent deviation module.

Referring now to FIG. 6, therein is shown a control flow of the frequent deviation module 416. The frequent deviation module 416 determines the high deviation frequency 230 of FIG. 2. The frequent deviation module 416 can determine the high deviation frequency 230 based on a total deviation count 606 during a time threshold 604 meeting or exceeding the deviation frequency threshold 232 of FIG. 2.

The frequent deviation module 416 can include a total deviation module 602, coupled to the deviation detection module 404 of FIG. 4. The total deviation module 602 calculates the total deviation count 606. The total deviation module 602 can calculate the total deviation count 606 by incrementing the total deviation count 606 according to the travel deviation 226 of FIG. 2 during the time threshold 604.

The total deviation module 602 can calculate by having the total deviation count 606 start at 0 or default value at the start of the navigation session or at the start of the route calculation. The total deviation count 606 can increment when the deviation detection module 404 outputs the travel deviation 226 to the total deviation module 602. The total deviation module 602 can account for each instance of the travel deviation 226 for a predetermined value of the time threshold 604. The total deviation module 602 can also implement a sliding window of time having length of the time threshold 604 in calculating the total deviation count 606 based on the travel deviation 226 recorded by the deviation detection module 404.

The frequent deviation module 416 can also include a threshold adjustment module 608, coupled to the total deviation module 602. The threshold adjustment module 608 adjusts the deviation frequency threshold 232. The threshold adjustment module 608 can adjust the deviation frequency threshold 232 when a weak signal flag 610 is determined. The weak signal flag 610 is defined as a flag indicating the signal strength 234 of FIG. 2 below a certain level and signal aliasing.

It has been discovered that the weak signal flag 610 and the deviation frequency threshold 232 provide an improved mechanism to determine the high deviation frequency 230. The weak signal flag 610 can improve the accuracy of the deviation frequency threshold 232, which in turn can improve the accuracy of the high deviation frequency 230. The weak signal flag 610 can further reduce unintended deviations by having the high deviation frequency 230 with improved accuracy.

The frequent deviation module 416 can also include a frequent deviation generation module 620, coupled to the threshold adjustment module 608. The frequent deviation generation module 620 determines the high deviation frequency 230. The frequent deviation generation module 620 can determine the high deviation frequency 230 with the total deviation count 606 meeting or exceeding the deviation frequency threshold 232.

For example, the high deviation frequency 230 can be determined when there are twelve deviations within five minutes based on the deviation frequency threshold 232 defined as ten deviations in five minutes. Also for example, the high deviation frequency 230 cannot be determined when there are eight deviations within five minutes based on the deviation frequency threshold 232 with the configuration of ten deviations in five minutes.

It has been discovered that the high deviation frequency 230 and the error-prone-scenario switch 212 of FIG. 2 provide user with a simplified interfacing mechanism to reduce unintended deviations by the user when following the route 206 of FIG. 2. The high deviation frequency 230 can reduce unintended deviations by enabling the navigation system 100 of FIG. 1 to identify portions on the route 206 that can cause the frequent deviation by the user. The error-prone-scenario switch 212 can provide the improved interface by giving the user choices for receiving the guidance and allowing the user to choose using various input modes, such as through voice commands or by selecting an icon on a touch-screen, which can allow the navigation system 100 to take appropriate remedial measures to prevent the frequent deviation along the route 206.

Figure 7:
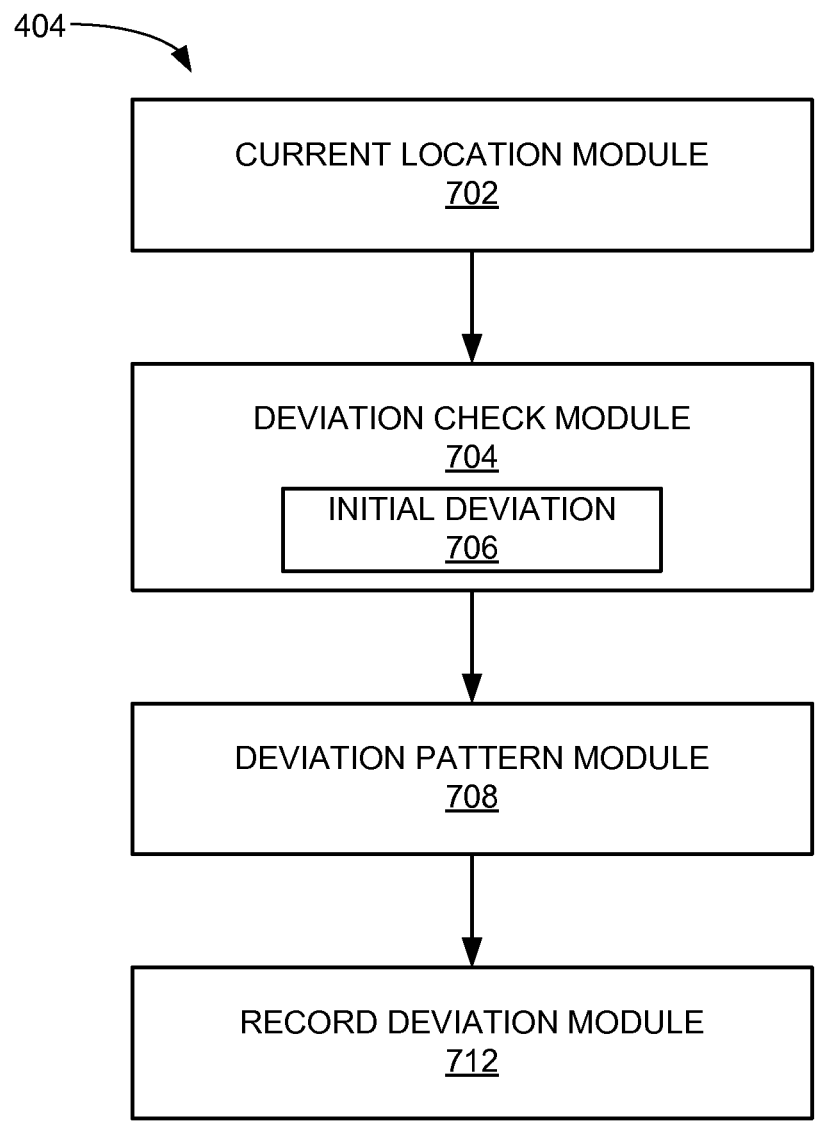
FIG. 7 is a control flow of the deviation detection module.

Referring now to FIG. 7, therein is shown a control flow of the deviation detection module 404. The deviation detection module 404 determines the travel deviation 226 of FIG. 2. The deviation detection module 404 can determine the travel deviation 226 based on the current location 222 of FIG. 2, the route 206 of FIG. 2 and the deviation pattern 406 of FIG. 4. When the travel deviation 226 is determined, the deviation detection module 404 can adjust the travel deviation 226 by sending the travel deviation 226 to the route generator module 402 of FIG. 4 to re-route from the current location 222 to the destination 208 of FIG. 2.

The deviation detection module 404 can include a current location module 702, coupled to the route generator module 402. The current location module 702 locates the current location 222 of the first device 102 of FIG. 1. The current location module 702 can locate the first device 102 by setting the output of the location unit 320 of FIG. 3 as the current location 222.

The deviation detection module 404 can also include a deviation check module 704, coupled to the current location module 702. The deviation check module 704 determines an initial deviation 706. The deviation check module 704 can compare the current location 222 to the route 206, and determine the initial deviation 706 for the navigation system 100 of FIG. 1 based on the current location 222 not on the route 206.

The deviation detection module 404 can also include a deviation pattern module 708, coupled to the deviation check module 704. The deviation pattern module 708 determines the travel deviation 226. The deviation pattern module 708 can determine the travel deviation 226 by assigning value of the initial deviation 706 to the travel deviation 226 when the initial deviation 706 is not in the deviation pattern 406.

The deviation detection module 404 can also include a record deviation module 712, coupled to the deviation pattern module 708. The record deviation module 712 records the travel deviation 226 for determining the deviation pattern 406.

The physical transformation of the error-prone-scenario switch 212 of FIG. 2 based on the error prone scenario 228 of FIG. 2 results in movement in the physical world through adjusting the route 206, such as for people using the first device 102, the vehicle, or a combination thereof, based on the operation of the navigation system 100. As the movement in the physical world occurs, such as the user making a wrong turn, the movement itself creates additional information that is converted back to the high deviation frequency 230 of FIG. 2 for the continued operation of the navigation system 100 and to continue the movement in the physical world.

The navigation system 100 describes the module functions or order as an example. The modules can be partitioned differently. For example, the switch module 420 of FIG. 4 and the route adjustment module 430 of FIG. 4 can be combined. Also for example, the map adjustment module 426 of FIG. 4 can receive the error prone scenario 228 from the error-prone-scenario detection module 410 of FIG. 4 directly. Each of the modules can operate individually and independently of the other modules.

Furthermore, data generated in one module can be used by another module without being directly coupled to each other. For example, the error-prone-scenario detection module 410 can receive the route 206 from the route generator module 402.

Figure 8:
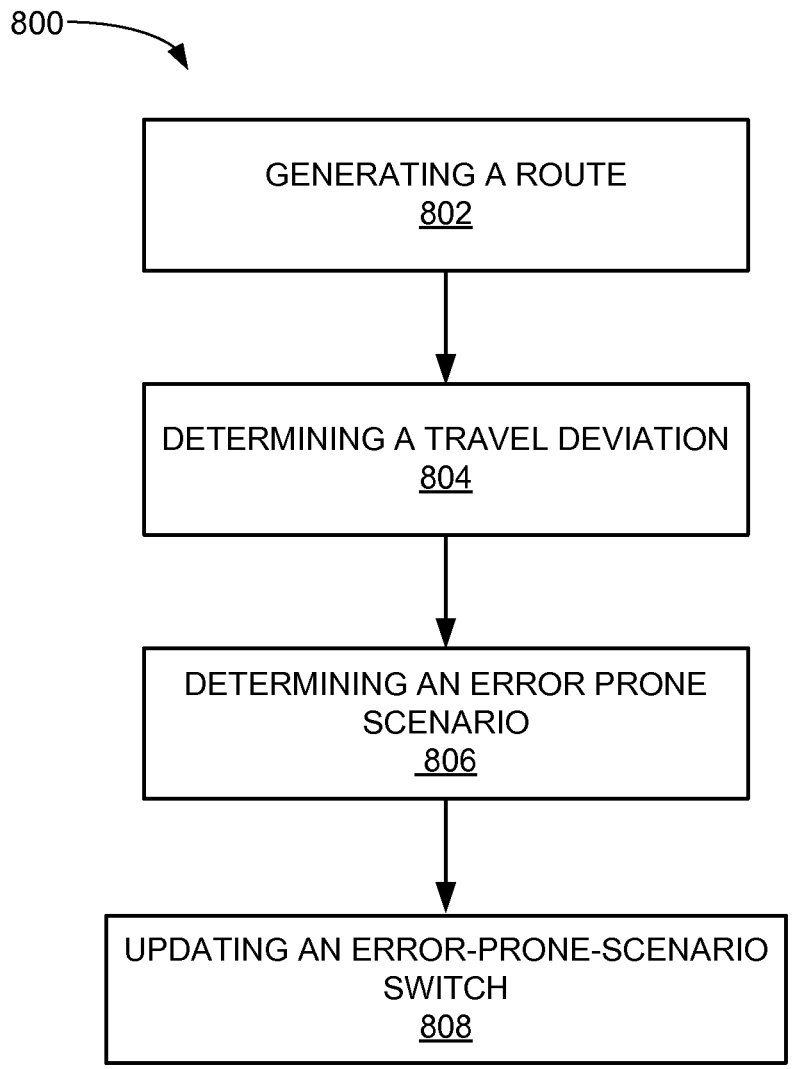
FIG. 8 is a flow chart of a method of operation of the navigation system in a further embodiment of the present invention.

Referring now to FIG. 8, therein is shown a flow chart of a method 800 of operation of the navigation system 100 in a further embodiment of the present invention. The method 800 includes: generating a route for navigating to a destination in a block 802; determining a travel deviation based on a current location and the route in a block 804; determining an error prone scenario based on the current location, the travel deviation, and the route in a block 806; and updating an error-prone-scenario switch based on the error prone scenario for displaying on a device in a block 808.

Thus, it has been discovered that the navigation system 100 of the present invention furnishes important and heretofore unknown and unavailable solutions, capabilities, and functional aspects for improving reliability in systems.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    generating a route with a control unit for navigating to a destination;
    determining a travel deviation based on a current location and the route;
    calculating a total deviation count by incrementing the total deviation count according to the travel deviation during a time threshold;
    adjusting a deviation frequency threshold based on a weak signal flag is determined;
    determining a high deviation frequency when the total deviation count meets or exceeds the deviation frequency threshold;
    determining an error prone scenario based on the high deviation frequency and the deviation frequency threshold adjusted wherein the deviation frequency threshold representing a specified number of occurrences of the travel deviation where the current location deviates from the route within a specified period of time, for comparing to the total deviation count, wherein one instance of the deviation frequency threshold having the specified number of occurrences within the specified period of time different from the specified number of occurrences of another instance of the deviation frequency threshold within a different instance of the specified period of time; and
    enabling an error-prone-scenario switch by varying a user interface based on the error prone scenario for varying an input mode for displaying on a device.

2. The method as claimed in claim 1 wherein determining the error prone scenario includes:
    calculating an adjacent road count by incrementing the adjacent road count for an adjacent road; and
    determining a nearby-road flag based on the adjacent road count being greater than one.

3. The method as claimed in claim 1 wherein:
    enabling the error-prone-scenario switch includes enabling the error-prone-scenario switch based on the error prone scenario being detected for enabling a user input; and
further comprising:
    adjusting the route to the destination for responding to the user input.

4. The method as claimed in claim 1 wherein enabling the error-prone-scenario switch includes disabling the error-prone-scenario switch based on the error prone scenario not being determined.

5. A method of operation of a navigation system comprising:
    generating a route with a control unit for navigating to a destination;
    detecting a current location based on GPS information for locating a device;
    determining a travel deviation based on the current location and the route;
    calculating a total deviation count by incrementing the total deviation count according to the travel deviation during a time threshold;
    adjusting a deviation frequency threshold based on a weak signal flag is determined;
    determining a high deviation frequency when the total deviation count meets or exceeds the deviation frequency threshold;
    determining an error prone scenario based on the high deviation frequency and the deviation frequency threshold, representing a specified number of occurrences of the travel deviation where the current location deviates from the route within a specified period of time, for comparing to the total deviation count, wherein one instance of the deviation frequency threshold having the specified number of occurrences within the specified period of time different from the specified number of occurrences of another instance of the deviation frequency threshold within a different instance of the specified period of time; and enabling an error-prone-scenario switch by varying a user interface based on the error prone scenario for displaying on the device.

6. The method as claimed in claim 5 wherein:
determining the error prone scenario includes determining a nearby-road flag based on the current location and the route; and
enabling the error-prone-scenario switch includes enabling the error-prone-scenario switch when the nearby-road flag is determined.

7. The method as claimed in claim 5 wherein:
determining the error prone scenario includes determining a high deviation frequency based on the travel deviation, and the deviation frequency threshold; and
enabling the error-prone-scenario switch includes enabling the error-prone-scenario switch when the high deviation frequency is determined.

8. The method as claimed in claim 5 wherein:
enabling the error-prone-scenario switch includes enabling the error-prone-scenario switch based on the error prone scenario being determined for enabling a user input; and
further comprising:
recording the current location for adjusting a map in response to the error prone scenario.

9. The method as claimed in claim 5 wherein determining the travel deviation includes:
generating the current location for locating the device;
generating an initial deviation based on the current location and the route;
determining the travel deviation by eliminating the initial deviation not in a deviation pattern; and
recording the travel deviation for determining the deviation pattern.

10. A navigation system comprising:
a control unit configured to:
generate a route for navigating to a destination,
determine a travel deviation based on a current location and the route,
calculating a total deviation count by incrementing the total deviation count according to the travel deviation during a time threshold;
adjusting a deviation frequency threshold based on a weak signal flag is determined;
determining a high deviation frequency when the total deviation count meets or exceeds the deviation frequency threshold;
determine an error prone scenario based on the high deviation frequency and the deviation frequency threshold, representing a specified number of occurrences of the travel deviation where the current location deviates from the route within a specified period of time, for comparing to the total deviation count, wherein one instance of the deviation frequency threshold having the specified number of occurrences within the specified period of time different from the specified number of occurrences of another instance of the deviation frequency threshold within a different instance of the specified period of time,
enable an error-prone-scenario switch by varying a user interface based on the error prone scenario, and
a communication interface, coupled to the control unit, configured to transmit the error-prone-scenario switch for displaying on a device.

11. The system as claimed in claim 10 wherein the control unit is configured to:
calculate an adjacent road count by incrementing the adjacent road count for the adjacent road; and
determine a nearby-road flag based on the adjacent road count being greater than one.

12. The system as claimed in claim 10 wherein the control unit is configured to:
enable the error-prone-scenario switch based on the error prone scenario being determined for enabling a user input; and
adjust the route to the destination for responding to the user input.

13. The system as claimed in claim 10 wherein the control unit is configured to disable the error-prone-scenario switch based on the error prone scenario not being determined.

14. The system as claimed in claim 10 wherein the control unit is configured to detect the current location for locating the device.

15. The system as claimed in claim 14 wherein the control unit is configured to:
determine a nearby-road flag based on the current location and the route; and
enable the error-prone-scenario switch when the nearby-road flag is determined.

16. The system as claimed in claim 14 wherein the control unit is configured to:
determine a high deviation frequency based on the travel deviation, and the deviation frequency threshold; and
enable the error-prone-scenario switch when the high deviation frequency is determined.

17. The system as claimed in claim 14 wherein the control unit is configured to:
enable the error-prone-scenario switch based on the error prone scenario being determined for enabling a user input; and
record the current location for adjusting a map in response to the error prone scenario.

18. The system as claimed in claim 14 wherein the control unit is configured to:
generate the current location for locating the device;
generate an initial deviation based on the current location and the route;
determine the travel deviation by eliminating the initial deviation not in a deviation pattern; and
record the travel deviation for determining the deviation pattern.

* * * * *